Dec. 30, 1941. H. LAVAL ET AL 2,267,868
METHOD OF PRODUCING DRILLS
Filed April 1, 1940
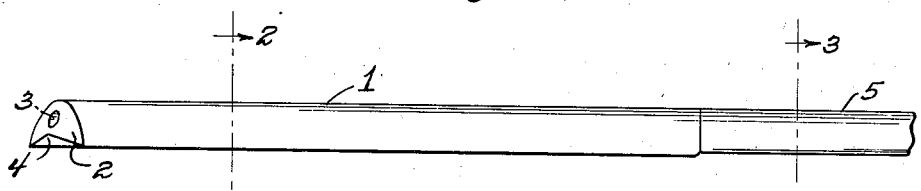
Harry Laval
Charles L. Simonsen
INVENTORS
BY Victor J. Evans & Co.
ATTORNEYS Patented Dec. 30, 1941

2,267,868

UNITED STATES PATENT OFFICE 2,267,868

METHOD OF PRODUCING DRILLS

Harry Laval, Loupurex, and Charles L. Simonsen, Bridgeville, Pa.

Application April 1, 1940, Serial No. 327,316

1 Claim. (Cl. 76—108)

This invention relates to methods of welding metals, and broadly to provide a method of butt welding drill sections of extreme dissimilar metals in a manner to permanently secure the sections together against any possibility of separation or breakage, regardless of the cross sectional shape thereof and passages therein, without distorting the bonded sections or obstructing the passages.

Specifically, our method is primarily for the purpose of electric welding by the resistance method, an alloy high speed steel bit directly to a carbon steel long tubular shank of a deep hole drill of the type used for drilling gun barrels, stay bolts for locomotives and the like, as well as the type used for rock drilling, especially in quarries, and yet retain the bore duct that provides the coolant, lubricant or water passage, free from fused metal, thus eliminating redrilling the bore and by directly welding the bit and shank together, such eliminates the intermediate butt member of high carbon steel now generally used, with the result it will be seen that our method materially reduces the time and expense of making and repairing drills of this character.

A further object is to provide a method of welding a drill bit to the shank thereof, that is simple and inexpensive, and yet produces a drill that is extremely efficient in use and service.

This invention also consists in certain other features, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a fragmentary side elevation of a drill made in accordance with our method.

Figure 2 is a sectional view taken approximately on line 2—2 of Figure 1.

Figure 3 is a sectional view taken approximately on line 3—3 of Figure 1.

Figure 4 is a longitudinal sectional view taken through the bit and a fragmentary portion of the shank, prior to welding the same together, and illustrates the duct clearing plunger within the shank.

Figure 5 is a similar view taken through the bit and shank after they have been welded together and illustrates the plunger within the duct, to render the same free from obstructions.

It might be mentioned here that the methods now in use for producing bits of the character set forth, generally consist in first welding a high carbon steel intermediate butt member to a high speed steel bit, thence welding a filled drill shank to the butt member, then drilling the filling and redrilling the bit and intermediate butt member to provide the coolant, lubricant or water duct, and finally machining and heat treating the welded drill. Such a method is disclosed by United States Patent No. 1,784,932, dated December 16, 1930, and it will be obvious that it is a long and tedious method, requiring many operations, the majority of which are entirely eliminated from our method and the latter produces a better drill.

Referring to the drawing in detail, the reference numeral 1 indicates the bit which is made from any suitable high speed steel in order to perform its cutting function without breakage or distortion and has a cutting end 2 which is made of any preferred or desirable form, it depending of course upon the type of drill, and the type shown is generally used for drilling gun barrels, stay bolts for locomotives and the like.

The bit has the usual duct 3 extending longitudinally therethrough, to provide a coolant or lubricant passage and likewise extending longitudinally thereof is the usual chip clearance groove 4.

The shank for drills of this character is very long and only a fragmentary portion 5 is shown, the shank being of hollow or tubular formation without a filler, to provide a bore or duct 6 that registers with the duct 3 when the shank is welded to the bit, and the shank is likewise provided with a chip clearance groove 7 for registration with the groove 4.

The shank is made from the usual carbon steel and that fact coupled with the thin cross sectional area thereof accounts for the extreme difficulty in the past, of welding the shank directly to the high speed steel bit, but by our method such can be done in an easy and expeditious manner, without possibility of separation or breakage, in that the joint and the portion of the shank adjacent to the bit is retained at the proper temperature to prevent the metal from becoming weak and brittle, and the metal of the bit is likewise retained at the proper temperature to fuse the same to the shank. This temperature control is brought about by dissipating the excess heat from and about the shank, at any point, by means of jets of gas or liquid, or by conduction.

In order to eliminate the redrilling step of the methods now in use, for removing obstructions from the point of juncture of the duct 3 with the duct 6, we provide a punch 8 in the form of a rod, wire, bar or the like, that is inserted in the shank to be moved across the joint, after the shank and bit have been welded together and during the cooling action, as well as at a critical moment just prior to the time that the metal becomes too hard to allow the punch to remove the obstructions that are provided by the fused metal extending into the duct.

From the above description and disclosure in the drawing, it will be obvious that our method consists essentially in disposing and holding the ends of the bit and the shank in abutting relation and welding the same together, preferably by an electrical resistance welding apparatus and during the welding action, heat is being dissipated from the shank to prevent burning or overheating thereof, so that the bit and shank will be properly fused together, as previously indicated, thence the plunger 8 is passed through the registering ducts for the purpose set forth. Finally any exterior obstructions about the joint are removed to provide a smooth exterior surface throughout the length of the drill.

While we have made reference in the specification and the appended claim to drills, it will of course be understood that our method is not limited solely for the purpose of welding together drill sections, but can be used for making and repairing all types of tools and other metallic elements where it becomes necessary or desirable to butt weld dissimilar metal sections and the like having different cross sectional areas.

It is thought from the foregoing description that the advantages and other features of the invention will be readily apparent, and it will be understood that changes may be made, providing such changes fall within the scope of the claim.

What we claim is:

Method of producing a complete deep hole drill including a high speed steel bit and a high carbon steel tubular shank, said bit and shank each having a longitudinal chip clearance groove exteriorly thereof, said bit having a longitudinal duct therein, and said method consisting of butt welding the ends of the bit and shank directly to each other with the duct in registration with the bore of the shank and the grooves of the bit and shank in registration with each other, dissipating heat from the shank during the welding action, passing a punch rod through the bore and duct directly after welding and at a critical moment before the metal hardens to remove obstructions at the welded joint, and finally machining the exterior surface of the drill to render the same smooth and unobstructed throughout the length thereof.

HARRY LAVAL.
CHARLES L. SIMONSEN.